(12) United States Patent
Iyer et al.

(10) Patent No.: US 7,117,163 B1
(45) Date of Patent: Oct. 3, 2006

(54) PRODUCT SUBSTITUTION SEARCH METHOD

(75) Inventors: Shekhar Iyer, Menlo Park, CA (US); Prashant Soral, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 321 days.

(21) Appl. No.: 09/594,652

(22) Filed: Jun. 15, 2000

(51) Int. Cl.
*G06Q 99/00* (2006.01)
(52) U.S. Cl. .......................................... 705/10; 705/26
(58) Field of Classification Search .................. 705/10, 705/26, 8, 9; 707/100
See application file for complete search history.

(56) References Cited

U.S. PATENT DOCUMENTS

| | | | |
|---|---|---|---|
| 4,996,642 A | 2/1991 | Hey | 364/419 |
| 5,041,972 A | 8/1991 | Frost | 364/401 |
| 5,237,496 A | 8/1993 | Kagami et al. | 365/401 |
| 5,305,199 A | 4/1994 | LoBiondo et al. | 364/403 |
| 5,321,833 A | 6/1994 | Chang et al. | 395/600 |
| 5,712,989 A | 1/1998 | Johnson et al. | 395/228 |
| 5,715,444 A | 2/1998 | Danish et al. | 395/604 |
| 5,717,865 A * | 2/1998 | Stratmann | 705/10 |
| 5,734,890 A | 3/1998 | Case et al. | 395/605 |
| 5,765,143 A | 6/1998 | Sheldon et al. | 705/28 |
| 5,819,245 A | 10/1998 | Peterson et al. | 706/16 |
| 5,835,087 A | 11/1998 | Herz et al. | 345/327 |
| 5,867,799 A * | 2/1999 | Lang et al. | 707/1 |
| 5,884,282 A * | 3/1999 | Robinson | 705/27 |
| 5,903,892 A | 5/1999 | Hoffert et al. | 707/10 |
| 5,909,023 A * | 6/1999 | Ono et al. | 235/380 |
| 5,918,014 A * | 6/1999 | Robinson | 395/200 |
| 5,918,223 A | 6/1999 | Blum et al. | 701/1 |
| 5,960,414 A | 9/1999 | Rand et al. | 705/28 |
| 5,963,920 A | 10/1999 | Rose et al. | 705/28 |
| 5,963,948 A | 10/1999 | Shilcrat | 707/100 |
| 5,983,220 A * | 11/1999 | Schmitt | 707/5 |
| 6,009,407 A | 12/1999 | Garg | 705/10 |
| 6,012,051 A | 1/2000 | Sammon, Jr. et al. | 706/52 |
| 6,018,738 A * | 1/2000 | Breese et al. | 707/100 |
| 6,035,284 A * | 3/2000 | Straub et al. | 705/28 |
| 6,049,777 A | 4/2000 | Sheena et al. | 705/10 |
| 6,055,519 A | 4/2000 | Kennedy et al. | 705/80 |
| 6,064,980 A | 5/2000 | Jacobi et al. | 705/26 |
| 6,167,380 A | 12/2000 | Kennedy et al. | 705/10 |
| 6,195,643 B1 * | 2/2001 | Maxwell | 705/10 |
| 6,195,652 B1 | 2/2001 | Fish | 707/2 |
| 6,249,774 B1 | 6/2001 | Roden et al. | 705/28 |
| 6,266,649 B1 * | 7/2001 | Linden et al. | 705/26 |
| 6,266,652 B1 | 7/2001 | Godin et al. | 705/37 |
| 6,286,005 B1 | 9/2001 | Cannon | 707/100 |

(Continued)

FOREIGN PATENT DOCUMENTS

EP 0463616 A2 6/1991

(Continued)

OTHER PUBLICATIONS www.zagat.com as archived on May 10, 2000—A restaurant review and recommendation web site.*

(Continued)

*Primary Examiner*—Susanna M. Diaz
(74) *Attorney, Agent, or Firm*—James E. Walton

(57) ABSTRACT

A system and method for responding to user requests for a product provides a selection of alternate products that are similar to the requested product. Available products each have a plurality of attributes, which are compared to corresponding attributes of the requested product. Available products having attributes which are similar to those of the requested product are ranked in order of a similarity measure, and presented to the user.

43 Claims, 2 Drawing Sheets

U.S. PATENT DOCUMENTS

| | | | |
|---|---|---|---|
| 6,321,133 B1 | 11/2001 | Smirnov et al. | 700/100 |
| 6,324,522 B1 | 11/2001 | Peterson et al. | 705/28 |
| 6,360,227 B1 | 3/2002 | Aggarwal et al. | 707/102 |
| 6,370,513 B1 * | 4/2002 | Kolawa et al. | 705/10 |
| 6,523,026 B1 | 2/2003 | Gillis | 707/3 |
| 6,529,877 B1 * | 3/2003 | Murphy et al. | 705/7 |
| 2002/0013721 A1 | 1/2002 | Dabbiere et al. | 705/7 |
| 2002/0019761 A1 | 2/2002 | Lidow | 705/10 |

FOREIGN PATENT DOCUMENTS

| | | |
|---|---|---|
| WO | WO 96/12238 | 4/1996 |
| WO | WO 97/02537 | 1/1997 |

OTHER PUBLICATIONS

Iyer, Automated retrieval and ranking of similar parts in agile manufacturing, IIEE Transactions, Oct. 1997, v.29, n.10, p. 859 (18 pages).*

Kong, Portals to boost shopping services, Oct. 25, 1999, San Jose Mercury News, 1E (2pages).*

Iyer, Indentification and ranking of similar parts in agile manufacturing, 4th Industrial Engineering Research Conference, Nashville, TN, May 1995, p. 709 (11 pages).*

Wyner, Gordon A. "Rethinking Product Development." Marketing Research: A Magazine of Management & Applications, vol. 10, No. 4, pp. 49-51, Winter 1998.*

Wyner, Gordon A. "Trade-off Analysis and Strategy Development." Marketing Research: A Magazine of Management & Applications, vol. 9, No. 2, pp. 35-37, Summer 1997.*

PCT, Notification of Transmittal of the International Search Report or the Declaration, 7 pages.

Funaki, et al., "Method and System for Production Planning Transaction," Identifier: JP 2001331693 A, Publication Date: Nov. 30, 2001.

Unknown, "Sellers Flock to OutletZoo.com as New Automatic Price Drop Method Moves Excess Inventory Online," Business Wire, Collaborative Communications, Inc., 2 pages, Oct. 25, 1999.

Unknown, "OpenSite Technologies, Inc. Helps AOL Raise $100,000 With Online Charity Auction," Business Wire, 1 page, Jan. 6, 1999.

Unknown, "News Briefs," Interactive PR & Marketing News, 2 pages, Sep. 19, 1997.

PCT, Notification of Transmittal of the International Search Report or the Declaration, 3 pages, Jan. 17, 2002.

PCT, Notification of Transmittal of the International Search Report or the Declaration, 6 pages, Jan. 23, 2002.

PCT, Notification of Transmittal of the International Search Report or the Declaration, 7 pages, Feb. 13, 2002.

PCT, Notification of Transmittal of the International Search Report or the Declaration, 5 pages, Feb. 13, 2002.

PCT, International Search Report, 5 pages, May 14, 2002.

PCT, Notification of Transmittal of the International Search Report or the Declaration, 3 pages, Aug. 29, 2002.

N. Tenorio, "System and Method for Retrieving Information According to Improved Matching Criteria," U.S. Appl. No. 09/742,851, pending, Dec. 20, 2000.

N. Tenorio, "System and Method for Negotiating According to Improved Matching Criteria," U.S. Appl. No. 09/750,617, pending, Dec. 20, 2000.

Notani, et al., "Extreme Capacity Management in an Electronic Marketplace Environment," U.S. Appl. No. 09/841,320, pending, Apr. 23, 2001.

* cited by examiner

PRODUCT SUBSTITUTION SEARCH METHOD

TECHNICAL FIELD OF THE INVENTION

This invention relates in general to the field of supply chain, enterprise and site planning and, more particularly, to a system and process for providing product alternates to partners in a multi-enterprise collaboration.

BACKGROUND OF THE INVENTION

Supply chain, enterprise and site planning applications and environments are widely used by manufacturing industries for decision support and to help manage complex manufacturing operations. In contrast with conventional planning software applications that provide a monolithic application architecture, products are becoming available to support multi-domain, distributed and heterogenous planning environments that characterize present day supply chains. One such product is the RHYTHM COLLABORATION suite of software products available from i2 Technologies, Inc.

An inherent characteristic of such products, and in particular the multi-domain heterogenous architecture of the RHYTHM COLLABORATION suite, is that they support products spanning multiple domains. The products supplied by the seller domain in the collaboration are consumed by the buyer domain. It is not uncommon that the product supply is constrained and does not meet the buyer demand. This, in general, leads to lost sales and customer dissatisfaction for the seller domain and can be further detrimental to the multi-enterprise supply chain as the buyer domain may not be able to satisfy its own customers in a timely fashion.

A solution to the problem is to provide the buyer domain with a list of viable alternate products that can be consumed instead of the original product. This will also extend the domain of the decision support across multiple enterprises in the supply chain. It is desirable for decision support software to cover even larger domains in the decision making process because typically, the larger the domain of the decision support, the more optimal the decision will be. It is the purpose of the present invention to develop a system and process for providing such product alternates to partners in a multi-enterprise collaborative supply chain.

SUMMARY OF THE INVENTION

In accordance with the present invention, a system and process for providing product alternates to partners in a multi-enterprise collaborative environment are disclosed that result in increased customer satisfaction, improved demand fulfillment and optimal decision making across multiple enterprises.

A computer implemented module within the RHYTHM COLLABORATION suite of products is provided for identifying the best products among the alternates available. The process involves a two-step approach. In the first step, a graphical user interface is used to gather product requirements from the user. This includes specification of the level of similarity between the original product and the alternate products required by the user. Based on the user's input of the product requirements and the desired similarity level, the process employs an algorithm to retrieve alternate products that satisfy the user requirements when compared to the original product. The process involves ranking the alternate products in order of their similarity to the original product. For each of the product characteristics identified by the user in the first search step, the algorithm is used to conduct a detailed similarity analysis which compares the more granular attributes because of which a product possesses the particular characteristic. The result of executing the sort algorithm is the generation of a global index value for each alternate product with respect to the original product. The alternate products are then ranked based on the global index. Finally, a graphical user interface presents the list of alternate products to the user.

In practice, there generally exist numerous feasible alternates to a product and in the absence of an expert system, such as that detailed in the present invention, the user must rely on subjective judgment and experience for trimming the set of feasible alternates to a manageable number. There is a high probability that the optimum alternates will be eliminated in such a subjective process. The system and process in the present invention provide a systematic procedure that will objectively select the best feasible alternates for a product. Another technical advantage of the present invention is that it eliminates the need for the user to know the details of the methodology and performs the search and sort operations based on user specifications through a menu operated graphical user interface.

Additional technical advantages should be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PREFERRED EMBODIMENT

In important objective of the present invention is to identify alternate products with adequate supply, which are similar to a candidate product with inadequate supply. A two-step procedure is adopted in the system in order to make it efficient and practical. The first step rapidly identifies a set of potentially useful alternate products based on product attributes that are desired in the candidate product. The second step evaluates only those alternate products that have been identified in the first step and ranks them based on an analysis of detailed product attributes. Thus the user can review only the few most relevant alternates and satisfy demand for the candidate by increasing the forecasted quantity for one or more of the alternates.

Figure 1:
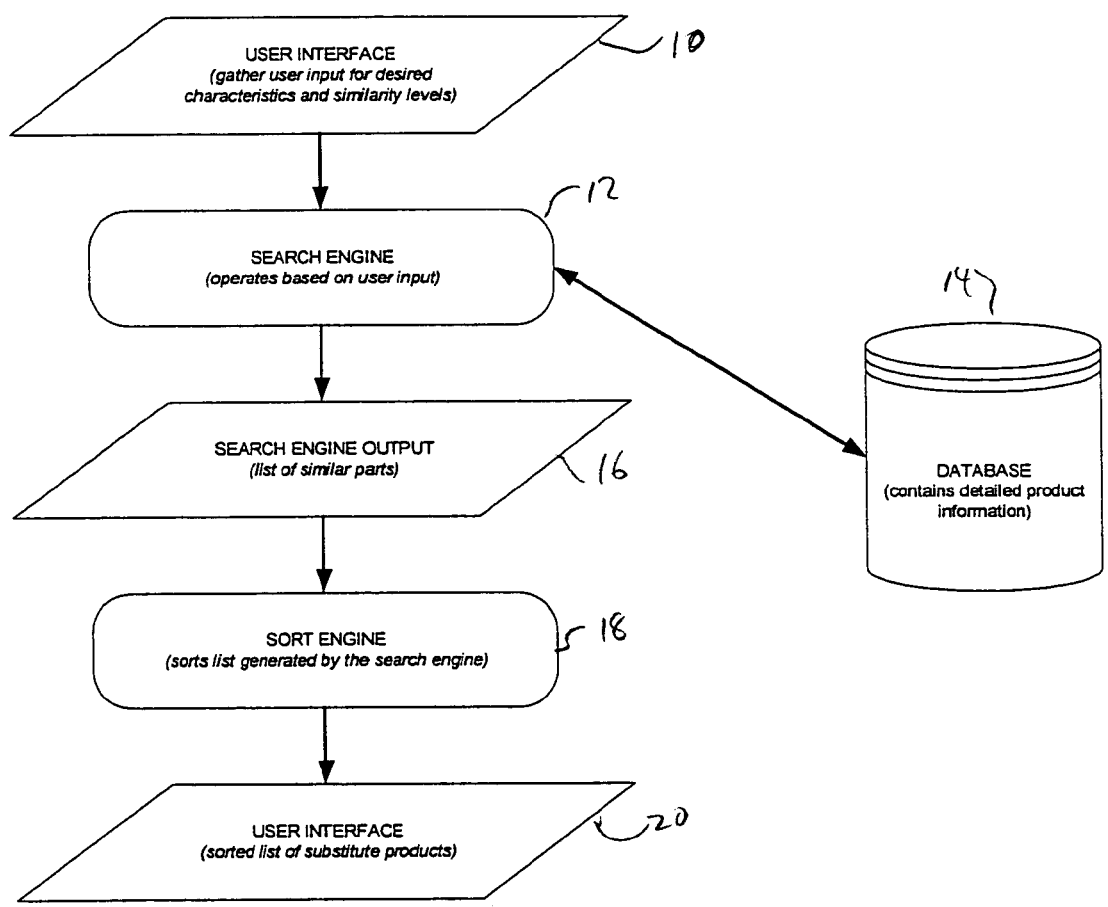
FIG. 1 is a diagram showing an overview of the process used to identify alternate products.

Referring to FIG. 1, a user enters requests at some type of user interface 10 as known in the art. The details of the interface 10 are not important to the present invention, and many different known interfaces are suitable for use. A search engine 12 operates to identify similar products, in turn utilizing a database 14 of detailed product information. Operation of the search engine 12 is described in detail below. Search engine 12 generates an output 16 that contains a list of similar parts according to the criteria set forth below. This is not yet presented to the user.

A sort engine 18 accepts as input the output 16 from search engine 12, and sorts the list of similar parts in an order that is most likely acceptable to the user. Details of this process are also described below. Once the preferred order is determined, the sorted list is presented to the user through user interface 20. In many cases, interfaces 10 and 20 will actually be one interface, even though they are separated in FIG. 1 for conceptual clarity.

The user is presented with a broad range of product characteristics. These characteristics are specific to the manufacturing environment being dealt with. The methodology is demonstrated here by applying it to the computer industry. Broad product characteristics for computers may include processing speed, multi-media support, data storage etc. Through a graphical interface, the user inputs the search intent by specifying the desired characteristics that the search is to be based upon, and the level of similarity for each product characteristic.

Each product characteristic is broken down into elementary components known as attributes. For example, the processing speed can be broken down into the internal clock speed for the CPU, the bus speed, the type and size of RAM. Consider products $P_i$ and $P_j$. X denotes the set of all attributes for a product e.g. a computer may have the following set of attributes: X={Processor Speed, Memory Size, Hard File Size, Monitor, CDROM, Operating System}. Two types of attributes can be identified:

a. Continuous valued attributes: The values of this class of attributes bear a decisive resemblance with each other, and the magnitude of the attribute similarity index signifies the degree of resemblance. Examples may include processor speed, RAM size, and hard disk size.

b. Binary valued attributes: The values of this class of attributes are unique and no consistent similarity can be identified among them. Examples may include distinct types of operating systems.

$X_m$ is an element of the set X. $V(X_m P_j)$ is the value of attribute m for product j. In trying to assess whether a product can act as a substitute for another product, the value of each attribute of the candidate substitute is compared with the value of the corresponding attribute for the original product.

The measure used to quantify the similarity of a substitute to the original product in terms of a specific attribute is called the Attribute Similarity Index. Assume that a user is trying to determine if product $P_j$ is a substitute for $P_i$. In addition, the products are being compared with respect to attribute $X_m$. The Attribute Similarity Index is denoted as $SI_{ij}(X_m)$. The first index (i) stands for the original product $P_i$ and the second one (j) for the substitute product $P_j$. The fact that this similarity index is for a specific attribute is denoted by $X_m$ in brackets.

The measure used to quantify the similarity of a substitute to the original product taking all attributes into consideration is called the Product Similarity Index. Assume that a user is trying to determine if $P_j$ is a substitute for $P_i$. The Product Similarity Index is denoted as $SI_{ij}$. The first index (i) stands for the original product $P_i$ and the second one (j) for the substitute product $P_j$. The Product Similarity Index is a weighted sum of Attribute Similarity Indices. Each attribute is assigned a weight. The weights are input obtained from the user through a graphical interface.

Algorithm

1. For each continuous valued attribute in the set X, the maximum and minimum values over all products are determined.

2. Consider a single product, $P_i$. Calculate Product Similarity Indices, $S_{ij}$, for all other products, $P_{j, j \neq i}$. Steps involved in doing so are given below.
    a. Consider a product $P_j$ other than $P_i$.
    b. The Attribute Similarity Index $SI_{ij}(X_m)$ is calculated for each attribute in the set X.
    c. The Product Similarity Index $SI_{ij}$ is calculated.
    d. $SI_{ij}$ is compared with a user-defined threshold value for Product Similarity Index $SI_{i,\,min}$. $SI_{i,\,min}$ holds for any product relative to original product $P_i$.
    e. Include $P_j$ as a substitute only if the Product Similarity Index exceeds $SI_{i,\,min}$.

3. The list generated in step 2 is arranged in descending order with respect to Product Similarity Index. In case of a tie with respect to Product Similarity Index, the products will be ranked with respect to the Attribute Similarity Index for the attribute with the highest weight. If even this does not eliminate the tie, the attribute with the second highest weight will be used and so on. The final ordered list of substitutes for product $P_i$ will be denoted as $P_{i,\,Subs}$.

4. Generate the list for all products.

Similarity Index Calculation

Attribute Similarity Index for Attributes with Numerical Values

Consider the following scenario. The user requests substitutes for product $P_O$. Assume product $P_O$ has an attribute $X_A$ with value $V(X_A P_O) = A_O$. The maximum and minimum attribute values for attribute $X_A$ have already been generated and are equal to $V_{max}(X_A) = A_{max}$ and $V_{min}(X_A) = A_{min}$ respectively. Product $P_Q$ and Product $P_R$ are being considered as substitutes for Product $P_O$. The value of attribute $X_A$ for Product $P_Q$ is $V(X_A P_Q) = A_Q$ and $A_R$ for Product $P_R$.

The system will compare the attribute value for the substitute, $A_Q$ with that for the original product, $A_O$. If $A_Q$ is less than $A_O$, the Attribute Similarity Index for Product $P_Q$ and attribute $X_A$, $SI_{OQ}(X_A)$ is calculated as follows:

$$SI_{OQ}(X_A) = \frac{x^2 - A_{min}^2}{A_o^2 - A_{min}^2}$$

If $A_Q$ is greater than $A_O$, the Attribute Similarity Index for Product $P_Q$ and attribute $X_A$, $SI_{OQ}(X_A)$ is calculated as follows:

$$SI_{OQ}(X_A) = \frac{x^2 - A_{max}^2}{A_o^2 - A_{max}^2}$$

If $A_Q$ equals $A_O$, the Attribute Similarity Index for Product $P_Q$ and attribute $X_A$, $SI_{OQ}(X_A)$ equals 1.

Figure 2:
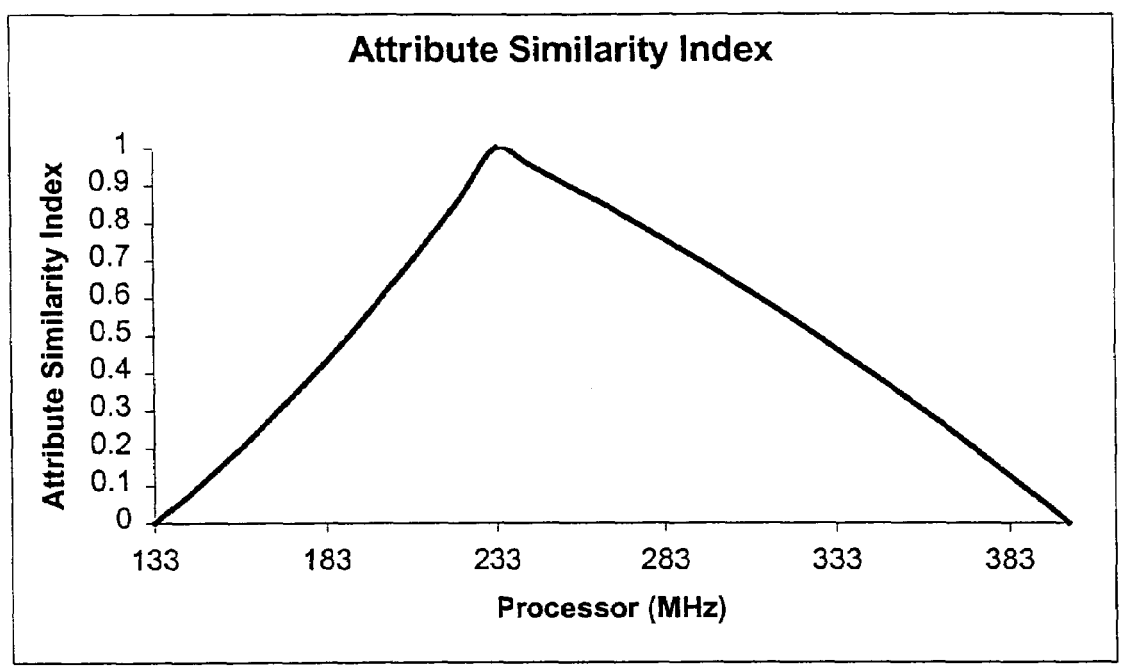
FIG. 2 is a diagram that demonstrates calculation of the Attribute Similarity Index.

As an example, consider FIG. 2, which is a graph of the Attribute Similarity Index for the "Processor" attribute. Here $A_O$ is 233 $MH_z$ for which the Product Attribute Similarity Index is 1. $A_{max}$ is 400 $MH_z$ and $A_{min}$ is 133 $MH_z$. The following equations hold:

$$SI_{OQ}(X_{Processor}) = \frac{x^2 - 133^2}{233^2 - 133^2} \quad \text{for } 133 \leq x < 233$$

$$SI_{OQ}(X_{Processor}) = 1 \quad \text{for } x = 233$$

$$SI_{OQ}(X_{Processor}) = \frac{x^2 - 400^2}{233^2 - 400^2} \quad \text{for } 233 < x \leq 400$$

Attribute Similarity Index for Binary Valued Attributes

If the attribute value for a substitute is not the same as that for the original product, the Attribute Similarity Index for the substitute is 0. It is 1 if the attribute value for the substitute is equal to that for the original.

Product Similarity Index

The Product Similarity Index for Product $P_Q$ is calculated as follows:

$$SI_{OQ} = SI_{OQ}(X_{Processor}) \times W_{Processor}\} + \{SI_{OQ}(X_{Memory}) \times W_{Memory}\} + \{SI_{OQ}(X_{HD}) \times W_{HD}\} + \{SI_{OQ}(X_{CDROM}) \times W_{CDROM}\} + \{SI_{OQ}(X_{Monitor}) \times W_{Monitor}\} + \{SI_{OQ}(X_{OS}) \times W_{OS}\}$$

The above assumes that the weights are normalized to one, i.e.

$$\sum_i W_i = 1.$$

The list of substitute products for each original product is shortened to include only those substitute products for which excess supply is available. The supply information can be obtained from an available advanced planning engine such as i2 TECHNOLOGIES' Supply Chain Planner application. The user is presented with the desired number of top-ranking substitutes in the list.

Extension of the Methodology

An important aspect of the present methodology is extensibility. Areas in which the present invention can be extended include the use of a more extensive analytic process to arrive at the weights for the selection of alternate products, the presentation of broad product characteristics instead of detailed product attributes to the user, and the elimination of the need to calculate substitutes for all products in the first stage of the method described above.

Although the present invention has been described in detail, it should be understood that various changes, substitutions can be made hereto without departing from the spirit and scope of the invention as defined by the appended claims.

What is claimed is:

1. A computer-implemented system for offering to a user one or more alternative products similar to a requested product, comprising:

a computer-implemented first user interface operable to receive a user request for a product having a plurality of product attributes, the user request specifying a desired attribute value for each of a plurality of selected product attributes;

a computer-implemented search procedure operable to select a set of one or more candidate alternative products having attribute values consistent with the desired attribute values specified in the user request for the selected product attributes, for each potential alternative product in a set of potential alternative products the search procedure operable to:

for each selected product attribute, compare the desired attribute value specified in the user request with the attribute value for the potential alternative product to determine an attribute similarity value for the selected product attribute for the potential alternative product; and determine a product similarity value for the potential alternative product according to the attribute similarity values, each attribute similarity value having been determined for a selected product attribute for which a desired attribute value is specified in the user request by comparing the desired attribute value specified in the user request with the attribute value for the potential alternative product;

the set of one or more candidate alternative products being selected according to the product similarity values for the potential alternative products, each product similarity value having been determined according to the attribute similarity values determined for each selected product attribute for which a desired attribute value is specified in the user request;

a computer-implemented sort procedure operable to rank the one or more candidate alternative products in order of decreasing similarity to the requested product determined according to the product similarity values for the one or more candidate alternative products, each product similarity value having been determined according to the attribute similarity values determined for each selected product attribute for which a desired attribute value is specified in the user request; and a computer-implemented second user interface operable to present the set of one or more candidate alternative products to the user for selection of a candidate alternative product, wherein each attribute similarity value is calculated according to either a first expression or a second expression depending on whether the attribute value for the potential alternative product is less than or greater than the desired attribute value for the requested product, wherein each attribute similarity value ASV for a selected product attribute is calculated as follows:

if the attribute value x for the potential alternative product is less than the desired attribute value $A_r$ for the requested product, $$ASV = \frac{x^2 - A_{\min}^2}{A_r^2 - A_{\min}^2}$$

where $A_{min}$ is a minimum attribute value for the selected product attribute across all potential alternative products; and if the attribute value x for the potential alternative product is greater than the desired attribute value $A_r$ for the requested product, $$ASV = \frac{x^2 - A_{\max}^2}{A_r^2 - A_{\max}^2}$$

where $A_{max}$ is a maximum attribute value for the selected product attribute across all potential alternative products.

2. The system of claim 1, wherein the first and second user interfaces are combined to function as a single user interface.

3. The system of claim 1, further comprising a database coupled to the search procedure, the database containing information identifying available products, the availability of such products, and the product attributes of such products, the search procedure operable to access the information in the database and, based on the accessed information, to exclude from the set of one or more candidate alternative products all potential alternative products for which no excess supply is available.

4. The system of claim 3, wherein the second user interface, when the user selects a candidate alternative product, is operable to cause the information in the database identifying the availability of the selected candidate alternative product to be updated.

5. The system of claim 1, wherein the desired attribute value for a selected product attribute comprises a maximum, minimum, or exact attribute value for the selected product attribute.

6. The system of claim 1, wherein:
the user request further specifies one or more of a maximum attribute value and a minimum attribute value for each selected product attribute; and
the search procedure is operable to exclude from the set of one or more candidate alternative products all potential alternative products having attribute values that do not satisfy one or more of the maximum attribute value and the minimum attribute value for a corresponding selected product attribute.

7. The system of claim 1, wherein the user request further specifies a desired level of similarity for each of one or more product characteristics, each product characteristic encompassing one or more selected product attributes.

8. The system of claim 7, wherein the specified desired level of similarity for a product characteristic acts as a constraint on the attribute values a potential alternate product may have to become a candidate alternative product.

9. The system of claim 1, wherein the search procedure is operable to determine maximum and minimum attribute values across all potential alternative products for each product attribute for which a desired attribute value is specified.

10. The system of claim 1, wherein if a selected product attribute is a binary attribute, then the attribute similarity value for a potential alternative product is zero if the attribute value for the potential alternative product is not the same as the desired attribute value for the requested product and is one if the attribute value for the potential alternative product is the same as the desired attribute value for the requested product.

11. The system of claim 1, wherein:
the user request further specifies an attribute weight for each selected product attribute; and
the search procedure is operable to:
determine a weighted sum of the attribute similarity values for the selected product attributes for the potential alternative product according to the attribute weights for the selected product attributes; and
determine the product similarity value for the potential alternative product according to the weighted sum of the attribute similarity values.

12. The system of claim 1, wherein the product similarity value for a potential alternative product comprises a global index value for the potential alternative product with respect to the requested product.

13. The system of claim 1, wherein:
the user request further specifies a threshold product similarity value; and
the search procedure is operable to compare the product similarity value for each potential alternative product with the threshold product similarity value and to exclude from the set of one or more candidate alternative products each potential alternative product having a product similarity value that does not satisfy the threshold product similarity value.

14. The system of claim 1, wherein the sort procedure is operable to limit the ranked candidate alternative products to a user-specified number.

15. The system of claim 1, wherein:
the user request further specifies an attribute weight for each selected product attribute; and
the sort procedure is operable to:
if two candidate alternative products are tied in that they have the same product similarity values, ranking the two candidate alternative products in order of decreasing attribute similarity value for the selected product attribute having the highest attribute weight;
if the two candidate alternative products are still tied in that they have the same attribute similarity value for the selected product attribute having the highest attribute weight, ranking the two candidate alternative products in order of decreasing attribute similarity value for the selected product attribute having the second highest attribute weight; and
if necessary to break the tie, continuing with respect to one or more successive selected product attributes having lower attribute weights until the tie is broken.

16. A computer-implemented method for offering to a user one or more alternative products similar to a requested product, the method being performed using one or more processing units, the method comprising:
using one or more processing units, receiving from the user a request for a preferred product having a plurality of product attributes, the user request specifying a desired attribute value for each of a plurality of selected product attributes;
using one or more processing units, selecting a set of one or more candidate alternative products having attributes consistent with the desired attribute values specified in the user request for the selected product attributes, comprising for each potential alternative product in a set of potential alternative products:
comparing, for each selected product attribute, the desired attribute value specified in the user request with the attribute value for the potential alternative product to determine an attribute similarity value for the selected product attribute for the potential alternative product; and
determining a product similarity value for the potential alternative product according to the attribute similarity values, each attribute similarity value having been determined for a selected product attribute for which a desired attribute value is specified in the user request by comparing the desired attribute value specified in the user request with the attribute value for the potential alternative product;
the set of one or more candidate alternative products being selected according to the product similarity values for the potential alternative products, each product similarity value having been determined according to the attribute similarity values determined for each selected product attribute for which a desired attribute value is specified in the user request;

using one or more processing units, rank ordering the one or more candidate alternative products according to their degree of similarity with the preferred product determined according to the product similarity values for the one or more candidate alternative products, each product similarity value having been determined according to the attribute similarity values determined for each selected product attribute for which a desired attribute value is specified in the user request; and using one or more processing units, presenting to the user the set of one or more candidate alternative products for selection of a candidate alternative product, wherein each attribute similarity value is calculated according to either a first expression or a second expression depending on whether the attribute value for the potential alternative product is less than or greater than the desired attribute value for the requested product, wherein each attribute similarity value ASV for a selected product attribute is calculated as follows:

if the attribute value x for the potential alternative product is less than the desired attribute value $A_r$ for the requested product, $$ASV = \frac{x^2 - A_{min}^2}{A_r^2 - A_{min}^2}$$

where $A_{min}$ is a minimum attribute value for the selected product attribute across all potential alternative products; and if the attribute value x for the potential alternative product is greater than the desired attribute value $A_r$ for the requested product, $$ASV = \frac{x^2 - A_{max}^2}{A_r^2 - A_{max}^2}$$

where $A_{max}$ is a maximum attribute value for the selected product attribute across all potential alternative products.

17. The method of claim 16, further comprising:
accessing information identifying available products, the availability of such products, and the product attributes of such products; and
based on the accessed information, excluding from the set of one or more candidate alternative products all potential alternative products for which no excess supply is available.

18. The method of claim 17, further comprising, in response to user selection of a candidate alternative product, causing the identifying the availability of the selected candidate alternative product to be updated.

19. The method of claim 16, wherein the desired attribute value for a selected product attribute comprises a maximum, minimum, or exact attribute value for the selected product attribute.

20. The method of claim 16, wherein:
the user request further specifies one or more of a maximum attribute value and a minimum attribute value for each selected product attribute; and
selecting the set of one or more candidate alternative products comprises excluding from the set of one or more candidate alternative products all potential alternative products having attribute values that do not satisfy one or more of the maximum attribute value and the minimum attribute value for a corresponding selected product attribute.

21. The method of claim 16, wherein the user request further specifies a desired level of similarity for each of one or more product characteristics, each product characteristic encompassing one or more selected product attributes.

22. The method of claim 21, wherein the specified desired level of similarity for a product characteristic acts as a constraint on the attribute values a potential alternate product may have to become a candidate alternative product.

23. The method of claim 16, further comprising determining maximum and minimum attribute values across all potential alternative products for each product attribute for which a desired attribute value is specified.

24. The method of claim 16, wherein if a selected product attribute is a binary attribute, then the attribute similarity value for a potential alternative product is zero if the attribute value for the potential alternative product is not the same as the desired attribute value for the requested product and is one if the attribute value for the potential alternative product is the same as the desired attribute value for the requested product.

25. The method of claim 16, wherein:
the user request further specifies an attribute weight for each selected product attribute; and
selecting the set of one or more candidate alternative products comprises:
determining a weighted sum of the attribute similarity values for the selected product attributes for the potential alternative product according to the attribute weights for the selected product attributes; and
determining the product similarity value for the potential alternative product according to the weighted sum of the attribute similarity values.

26. The method of claim 16, wherein the product similarity value for a potential alternative product comprises a global index value for the potential alternative product with respect to the requested product.

27. The method of claim 16, wherein:
the user request further specifies a threshold product similarity value; and
selecting the set of one or more candidate alternative products comprises comparing the product similarity value for each candidate alternative product with the threshold product similarity value and excluding from the set of one or more candidate alternative products each candidate alternative product having a product similarity value that does not satisfy the threshold product similarity value.

28. The method of claim 16, further comprising limiting the ranked candidate alternative products to a user-specified number.

29. The method of claim 16, wherein:
the user request further specifies an attribute weight for each selected product attribute; and
rank ordering the one or more candidate alternative products comprises:

if two candidate alternative products are tied in that they have the same product similarity values, ranking the two candidate alternative products in order of decreasing attribute similarity value for the selected product attribute having the highest attribute weight;

if the two candidate alternative products are still tied in that they have the same attribute similarity value for the selected product attribute having the highest attribute weight, ranking the two candidate alternative products in order of decreasing attribute similarity value for the selected product attribute having the second highest attribute weight; and if necessary to break the tie, continuing with respect to one or more successive selected product attributes having lower attribute weights until the tie is broken.

30. Software for offering to a user one or more alternative products similar to a requested product, the software embodied in computer-readable media and when executed operable to:

receive from the user a request for a preferred product having a plurality of product attributes, the user request specifying a desired attribute value for each of a plurality of selected product attributes;

select a set of one or more candidate alternative products having attributes consistent with the desired attribute values specified in the user request for the plurality of selected product attributes, comprising for each potential alternative product in a set of potential alternative products:

comparing, for each selected product attribute, the desired attribute value specified in the user request with the attribute value for the potential alternative product to determine an attribute similarity value for the selected product attribute for the potential alternative product; and determining a product similarity value for the potential alternative product according to the attribute similarity values, each attribute similarity value having been determined for a selected product attribute for which a desired attribute value is specified in the user request by comparing the desired attribute value specified in the user request with the attribute value for the potential alternative product;

the set of one or more candidate alternative products being selected according to the product similarity values for the potential alternative products, each product similarity value having been determined according to the attribute similarity values determined for each selected product attribute for which a desired attribute value is specified in the user request;

rank order the one or more candidate alternative products according to their degree of similarity with the preferred product determined according to the product similarity values for the one or more candidate alternative products, each product similarity value having been determined according to the attribute similarity values determined for each selected product attribute for which a desired attribute value is specified in the user request; and present to the user the set of one or more candidate alternative products for selection of a candidate alternative product, wherein each attribute similarity value is calculated according to either a first expression or a second expression depending on whether the attribute value for the potential alternative product is less than or greater than the desired attribute value for the requested product, wherein each attribute similarity value ASV for a selected product attribute is calculated as follows:

if the attribute value x for the potential alternative product is less than the desired attribute value $A_r$ for the requested product, $$ASV = \frac{x^2 - A_{min}^2}{A_r^2 - A_{min}^2}$$

where $A_{min}$ is a minimum attribute value for the selected product attribute across all potential alternative products; and if the attribute value x for the potential alternative product is greater than the desired attribute value $A_r$ for the requested product, $$ASV = \frac{x^2 - A_{max}^2}{A_r^2 - A_{max}^2}$$

where $A_{max}$ is a maximum attribute value for the selected product attribute across all potential alternative products.

31. The software of claim 30, further operable to:

access information identifying available products, the availability of such products, and the product attributes of such products; and based on the accessed information, exclude from the set of one or more candidate alternative products all potential alternative products for which no excess supply is available.

32. The software of claim 31, further operable to, in response to user selection of a candidate alternative product, cause the identifying the availability of the selected candidate alternative product to be updated.

33. The software of claim 30, wherein the desired attribute value for a selected product attribute comprises a maximum, minimum, or exact attribute value for the selected product attribute.

34. The software of claim 30, wherein:

the user request further specifies one or more of a maximum attribute value and a minimum attribute value for each selected product attribute; and selecting the set of one or more candidate alternative products comprises excluding from the set of one or more candidate alternative products all potential alternative products having attribute values that do not satisfy one or more of the maximum attribute value and the minimum attribute value for a corresponding selected product attribute.

35. The software of claim 30, wherein the user request further specifies a desired level of similarity for each of one or more product characteristics, each product characteristic encompassing one or more selected product attributes.

36. The software of claim 35, wherein the specified desired level of similarity for a product characteristic acts as a constraint on the attribute values a potential alternate product may have to become a candidate alternative product.

37. The software of claim 30, further operable to determine maximum and minimum attribute values across all potential alternative products for each product attribute for which a desired attribute value is specified.

38. The software of claim 30, wherein if a selected product attribute is a binary attribute, then the attribute similarity value for a potential alternative product is zero if the attribute value for the potential alternative product is not the same as the desired attribute value for the requested product and is one if the attribute value for the potential alternative product is the same as the desired attribute value for the requested product.

39. The software of claim 30, wherein:
the user request further specifies an attribute weight for each selected product attribute; and
selecting the set of one or more candidate alternative products comprises:
determining a weighted sum of the attribute similarity values for the selected product attributes for the potential alternative product according to the attribute weights for the selected product attributes; and
determining the product similarity value for the potential alternative product according to the weighted sum of the attribute similarity values.

40. The software of claim 30, wherein the product similarity value for a potential alternative product comprises a global index value for the potential alternative product with respect to the requested product.

41. The software of claim 30, wherein:
the user request further specifies a threshold product similarity value; and
selecting the set of one or more candidate alternative products comprises comparing the product similarity value for each candidate alternative product with the threshold product similarity value and excluding from the set of one or more candidate alternative products each candidate alternative product having a product similarity value that does not satisfy the threshold product similarity value.

42. The software of claim 30, further operable to limit the ranked candidate alternative products to a user-specified number.

43. The software of claim 30, wherein:
the user request further specifies an attribute weight for each selected product attribute; and
rank ordering the one or more candidate alternative products comprises:
if two candidate alternative products are tied in that they have the same product similarity values, ranking the two candidate alternative products in order of decreasing attribute similarity value for the selected product attribute having the highest attribute weight;
if the two candidate alternative products are still tied in that they have the same attribute similarity value for the selected product attribute having the highest attribute weight, ranking the two candidate alternative products in order of decreasing attribute similarity value for the selected product attribute having the second highest attribute weight; and
if necessary to break the tie, continuing with respect to one or more successive selected product attributes having lower attribute weights until the tie is broken.

\* \* \* \* \*